Patented Sept. 2, 1952

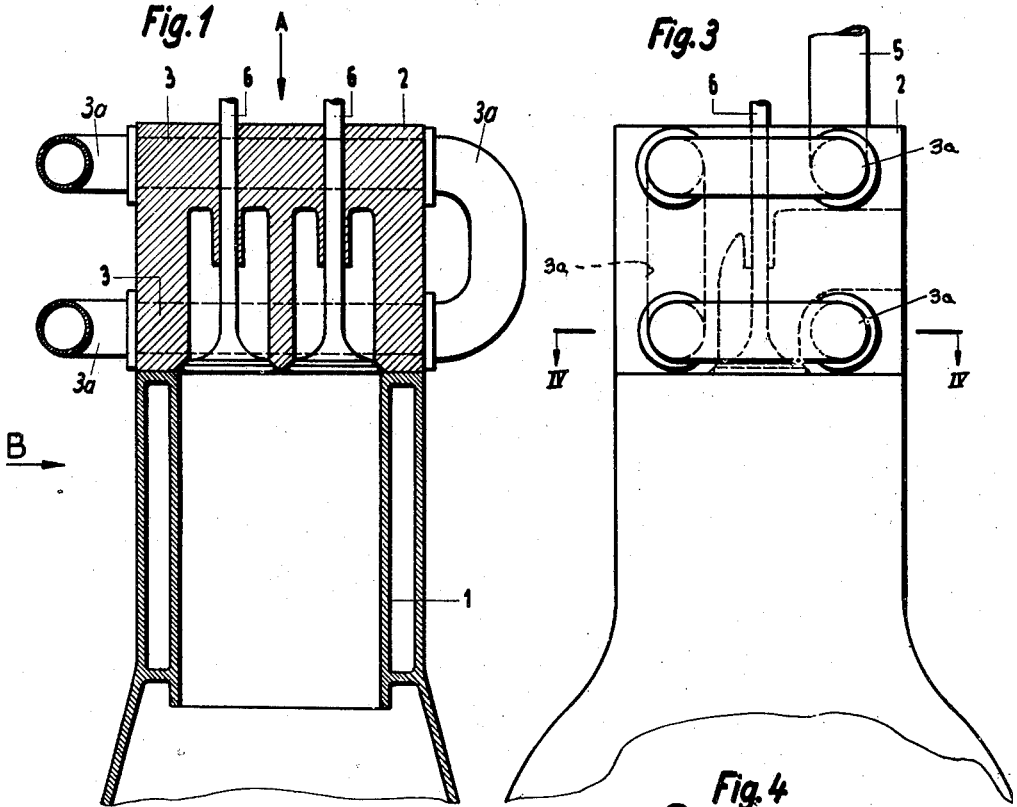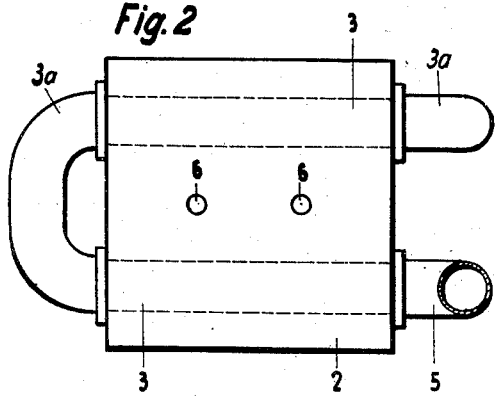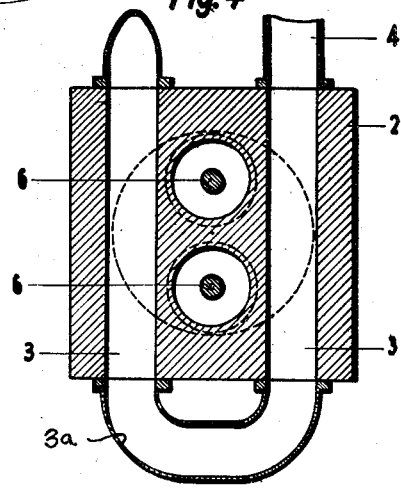

2,608,963

UNITED STATES PATENT OFFICE 2,608,963

ARRANGEMENT FOR AND METHOD OF TRANSFERRING HEAT AND COLD FROM AND TO MACHINE PARTS

Kurt Haase, Melkendorf, near Kulmbach, and Walter Ostwald, Heppenheim, Germany, assignors to Südwerke G. m. b. H., Kulmbach, Germany Application December 29, 1949, Serial No. 135,771
In Germany December 30, 1948

5 Claims. (Cl. 123—41.82)

When building machine parts, especially cylinders and cylinder heads of power plants and work-performing machinery, it is customary to provide the same with passage means of substantially the same cross-section throughout their length for conveying cooling or heating means therethrough. However, these passage means as heretofore provided, have a relatively complicated shape and, as a rule, are spiral-shaped with at least a plurality of windings. Consequently, they are difficult to get at, and as a result thereof, can either not at all or only incompletely be cleaned, so that the deposit of lime cannot properly be coped with. On the other hand, the deposit of lime in such passages, reduces the effective cross-section of the cooling or heating channels, thereby throttling the flow of cooling or heating media therethrough, which in turn results in a reduction in the cooling or heating effect. In addition to the above, the provision of the heretofore customary winding cooling or heating channels, especially in cylinder heads, is rather difficult and expensive.

It is, therefore, an object of the present invention to provide an arrangement which will overcome the above-mentioned drawbacks.

It is a further object of this invention to provide an arrangement which will make it possible to machine the channels for the transfer of heat or cold without complicating the structure.

It is a still further object of this invention to make it possible to locate the cooling or heating channels in the respective machine parts wherever it will result in the most effective temperature exchange without in any way affecting a proper cleaning of said channels, thus bringing about a greater efficiency of the machine or plant involved.

These and other objects and advantages of the invention will appear more clearly from the following specification in connection with the accompanying drawings, in which:

Figure 1 illustrates a vertical section through a cylinder head and cylinder block pertaining thereto.

Figure 2 is a top view of the arrangement shown in Figure 1 and viewed in the direction of the arrow A.

Figure 3 illustrates the arrangement of Figure 1 seen in the direction of the arrow B.

Figure 4 is a section along the line C, D of Figure 3.

General arrangement

In order to cool or heat machine parts of various types, for instance, machine tools or cylinders, and/or cylinder heads of power plants, such machine parts are provided with channels or conduit means of at least approximately even cross sections, through which channels or conduit means pass the cooling or heating means, such as water, brine, air or other heat or cold conveying fluid media. According to the present invention, these channel or conduit means are subdivided into a plurality of sections of simple shape located in the respective machine part and respectively provided with an individual inlet and outlet. These sections are interconnected by tube means registering therewith and detachably connected to the outside of the respective machine part. The temperature exchange is effected by the material of the machine part involved, which may, for instance, consist of cast or forged light metal, brass, cast-iron, wrought-iron, etc. The temperature conveying channels are preferably so arranged that they can be machined or can be constructed as cast-in conduits made of material having a higher melting point. When a liquid heat or cold conveying fluid medium is used, the channels are preferably so arranged that they ascend in a continuous manner, or by steps and, if desired, additional cooling fins may be arranged on the outside. In order to increase the area over which the temperature exchange takes place, and also to increase the turbulence supporting a favorable heat or cold transfer, the inner areas of the channels may be made corrugated or provided with other uneven surfaces.

When cooling, it is preferable to pass the cooling medium in one and the same direction, i. e., to introduce the cooling medium into the channels at a cool spot, and to withdraw the cooling medium at a hot spot. This manner of cooling will require the least cooling effort. When employing a liquid cooling medium for cooling machine parts separated from each other by a joint, the connections for the cooling medium are preferably not arranged at said joint, but separate therefrom, so that the gasket at said joint will merely serve one purpose. By subjecting the liquid or gaseous heat or cold conveying medium in the channels to a high flow velocity, a particularly favorable cooling result with regard to the quantity used of the fluid medium, and also with regard to efficiency, is obtained, and this result is furthermore improved by increased turbulence.

When applying the present invention to the air cooling of internal combustion engines, the further advantage is obtained that the motor will run with less noise than it has been possible heretofore with motors air cooled in the conventional manner and provided with cylinders having a thin wall and a great number of cooling fins.

Structural arrangement

Referring now to the drawing and, in particular, the structure shown therein comprises the cylinder 1 and the cylinder head 2, of an internal combustion engine. The cylinder head 2 is connected to the cylinder 1 in any conventional manner, for instance, by bolts (not shown in the drawing). The cylinder head 2 is, according to the present invention, provided with an individual channel 3 which in the embodiment shown in Figures 1 to 4 are straight tubular passages. These channel sections 3 are interconnected by pipes 3a located on the outside of the cylinder head and detachably connected thereto in any convenient manner. The pipes 3a together with the channel sections 3 form a continuous channel through which is passed the cooling medium which enters the cylinder head 2 through an inlet 4 (see Figure 4). The cooling medium is withdrawn through the outlet 5 (Figures 2, 3). The cylinder head 2 has furthermore suspended therein, tappet valves 6 which, of course, may also be arranged standing in the cylinder head, rather than hanging. The cylinder 1 is cooled in a manner known per se, by a cooling medium which, after having passed through the cooling chambers of the cylinder head, is withdrawn and may be introduced into the cylinder head for cooling the same.

It will be appreciated that the arrangement of the channel sections 3 and the connecting pipes 3a according to the present invention, makes the provision of cooling or heating channels very simple, while making it possible in a very simple manner by temporarily disconnecting the pipes 3a, thoroughly to clean the channel sections 3 as well as the pipes 3a. The simple shape of the channel sections 3a also makes it possible to machine these sections whenever desired.

While the invention has been described in connection with the cooling of the cylinder head of an internal combustion engine, it is, of course, understood that the principles of the invention are by no means limited to the cylinder heads of internal combustion engines, but may also be applied to other parts thereof and other types of machinery having connected therewith, the problem of heating or cooling parts. The invention may be applied to the transfer of heat, as well as to the transfer of cold, and comprises any combinations within the scope of the appended claims.

What we claim is:

1. In combination, a cylinder head having conduit means of substantially equal cross section throughout the length thereof for passing a cooling or heating medium therethrough, said conduit means being composed of a plurality of individual sections with each section open at both of its ends, and pipe means detachably connected to the outside of said cylinder head and interconnecting said individual sections of said conduit means.

2. In combination, a cylinder head having a plurality of passage means of substantially the same cross-section extending straight through said cylinder head from one side to the other side thereof, and conduit means detachably connected to said head and registering with said passage means for interconnecting the same so as to allow the successive passage of cooling or heating means through all of said passage means.

3. In combination, a cylinder head having a plurality of passage means of substantially the same cross-section extending straight through said cylinder head from one side to the other side thereof and arranged in different planes, and conduit means detachably connected to the outside of said head and registering with said passage means for interconnecting the same so as to allow the successive passage of cooling or heating means through said passage means.

4. In combination, a cylinder head having a plurality of passage sections of substantially the same cross-section throughout the length thereof extending straight through said cylinder head from one side to the other side thereof, each of said passage sections being open at both ends, and said passage sections being arranged in different planes so that each plane contains two substantially parallel passage sections, and a plurality of pipe means detachably connected to the outside of said cylinder head and respectively registering with said passage sections, the arrangement being such that the pipe means on one side of said head respectively directly interconnect passage sections of the same plane, the pipe means on the other side directly interconnecting passage sections of different planes.

5. A cylinder head according to claim 2, in which the passage means extend in horizontal direction.

KURT HAASE.
WALTER OSTWALD.

REFERENCES CITED

The following references are of record in the file of this patent:

UNITED STATES PATENTS

| Number | Name | Date |
|---|---|---|
| 1,279,008 | Ross | Sept. 17, 1918 |
| 2,277,113 | Kimmel | Mar. 24, 1942 |
| 2,339,972 | Anderson et al. | Jan. 25, 1944 |
| 2,417,448 | Rouy | Mar. 18, 1947 |

FOREIGN PATENTS

| Number | Country | Date |
|---|---|---|
| 116,627 | Austria | Mar. 10, 1930 |
| 552,697 | Germany | June 15, 1932 |
| 899,611 | France | Aug. 28, 1944 |
| 591,380 | Great Britain | Aug. 15, 1947 |